United States Patent
Choi

(10) Patent No.: US 10,075,585 B2
(45) Date of Patent: Sep. 11, 2018

(54) ELECTRONIC DEVICE FOR DETECTING INFORMATION OF PERSON ON THE OTHER END OF CALL AND METHOD THEREOF

(71) Applicant: Samsung Electronics Co., Ltd., Gyeonggi-do (KR)

(72) Inventor: Seung-Jin Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/295,157

(22) Filed: Jun. 3, 2014

(65) Prior Publication Data

US 2014/0357240 A1    Dec. 4, 2014

(30) Foreign Application Priority Data

Jun. 3, 2013  (KR) ............. 10-2013-0063545

(51) Int. Cl.
| | | |
|---|---|---|
| H04M 1/57 | (2006.01) | |
| H04M 3/42 | (2006.01) | |
| H04W 4/16 | (2009.01) | |
| H04M 1/725 | (2006.01) | |
| G06F 1/16 | (2006.01) | |
| G06F 3/0482 | (2013.01) | |

(52) U.S. Cl.
CPC ........ *H04M 3/42042* (2013.01); *G06F 1/163* (2013.01); *G06F 1/1626* (2013.01); *G06F 1/1694* (2013.01); *G06F 3/0482* (2013.01); *H04M 1/575* (2013.01); *H04M 1/7253* (2013.01); *H04W 4/16* (2013.01)

(58) Field of Classification Search
CPC ................. H04M 2250/02; H04M 3/42042
USPC ................ 455/415, 418, 425, 566–567
See application file for complete search history.

(56) References Cited

U.S. PATENT DOCUMENTS

| | | | |
|---|---|---|---|
| 6,573,883 B1 | 6/2003 | Bartlett | |
| 8,428,568 B1* | 4/2013 | Kim | H04M 3/02 455/415 |
| 8,825,028 B2 | 9/2014 | Okuda | |
| 2002/0068600 A1* | 6/2002 | Chihara | H04B 1/385 455/557 |
| 2002/0115478 A1* | 8/2002 | Fujisawa | H04M 1/6505 455/567 |

(Continued)

FOREIGN PATENT DOCUMENTS

| | | |
|---|---|---|
| EP | 2 472 835 A1 | 7/2012 |
| EP | 2 584 457 A1 | 4/2013 |

(Continued)

OTHER PUBLICATIONS

Extended European Search Report dated Oct. 9. 2014 in connection with European Patent Application No. 14167722.9; 8 pages.

(Continued)

*Primary Examiner* — Dung Hong

(57) ABSTRACT

A method and apparatus for detecting information of a person on the other end of a call. In a method of operating a first electronic device synchronized with a second electronic device, the method includes receiving a call requested from a third electronic device, detecting information related to the third electronic device, and transmitting data regarding the detected information to the second electronic device.

16 Claims, 12 Drawing Sheets

(56) References Cited

U.S. PATENT DOCUMENTS

| | | | | |
|---|---|---|---|---|
| 2004/0075701 | A1* | 4/2004 | Ng | G06Q 30/02 715/867 |
| 2005/0141686 | A1* | 6/2005 | Matsunaga | H04M 1/274583 379/142.01 |
| 2005/0266891 | A1* | 12/2005 | Mullen | H04M 1/72527 455/567 |
| 2006/0255963 | A1* | 11/2006 | Thompson | G08C 17/02 340/12.23 |
| 2007/0243907 | A1* | 10/2007 | Jin | H04N 5/44513 455/566 |
| 2007/0293206 | A1* | 12/2007 | Lund | H04M 3/42068 455/415 |
| 2009/0172592 | A1* | 7/2009 | Schirmer | G06Q 10/109 715/810 |
| 2009/0181726 | A1* | 7/2009 | Vargas | H04M 1/72533 455/567 |
| 2009/0323915 | A1* | 12/2009 | Sasaki | H04M 1/56 379/112.01 |
| 2010/0112964 | A1* | 5/2010 | Yi | G04G 9/0064 455/90.3 |
| 2010/0215161 | A1* | 8/2010 | Baccay | H04M 1/575 379/142.04 |
| 2012/0142323 | A1* | 6/2012 | Okuda | H04M 1/575 455/415 |
| 2012/0158744 | A1* | 6/2012 | Tseng | G06F 17/30575 707/748 |
| 2012/0258692 | A1* | 10/2012 | Luk | H04M 3/42042 455/414.1 |
| 2013/0040610 | A1* | 2/2013 | Migicovsky | H04L 1/1867 455/412.2 |
| 2013/0080539 | A1* | 3/2013 | Jan | G06Q 30/0241 709/206 |
| 2013/0095801 | A1* | 4/2013 | Kermoian | H04M 1/72597 455/414.1 |
| 2013/0157632 | A1* | 6/2013 | Moran | H04W 4/16 455/415 |
| 2013/0254705 | A1* | 9/2013 | Mooring | G06F 3/0488 715/784 |
| 2014/0274002 | A1* | 9/2014 | Hogan | H04W 4/12 455/415 |
| 2014/0280578 | A1* | 9/2014 | Barat | G06F 15/17312 709/204 |
| 2014/0347289 | A1* | 11/2014 | Suh | G06F 3/017 345/173 |
| 2015/0234903 | A1* | 8/2015 | Mukai | G06F 17/30554 707/746 |
| 2016/0037346 | A1* | 2/2016 | Boettcher | H04M 1/72519 455/411 |
| 2016/0219142 | A1* | 7/2016 | Brown | G06Q 30/0241 |

FOREIGN PATENT DOCUMENTS

| | | |
|---|---|---|
| KR | 10-2005-0028601 | 3/2005 |
| KR | 10-2006-0029723 | 4/2006 |
| KR | 10-2006-0105152 | 10/2006 |

OTHER PUBLICATIONS

European Examination Report dated Jul. 5, 2016 in connection with European Patent Application No. 14167722.9; 6 pages.

Summons to attend oral proceedings pursuant to Rule 115(1) EPC dated Dec. 13, 2017 in connection with European Patent Application No. 14 167 722.9.

* cited by examiner

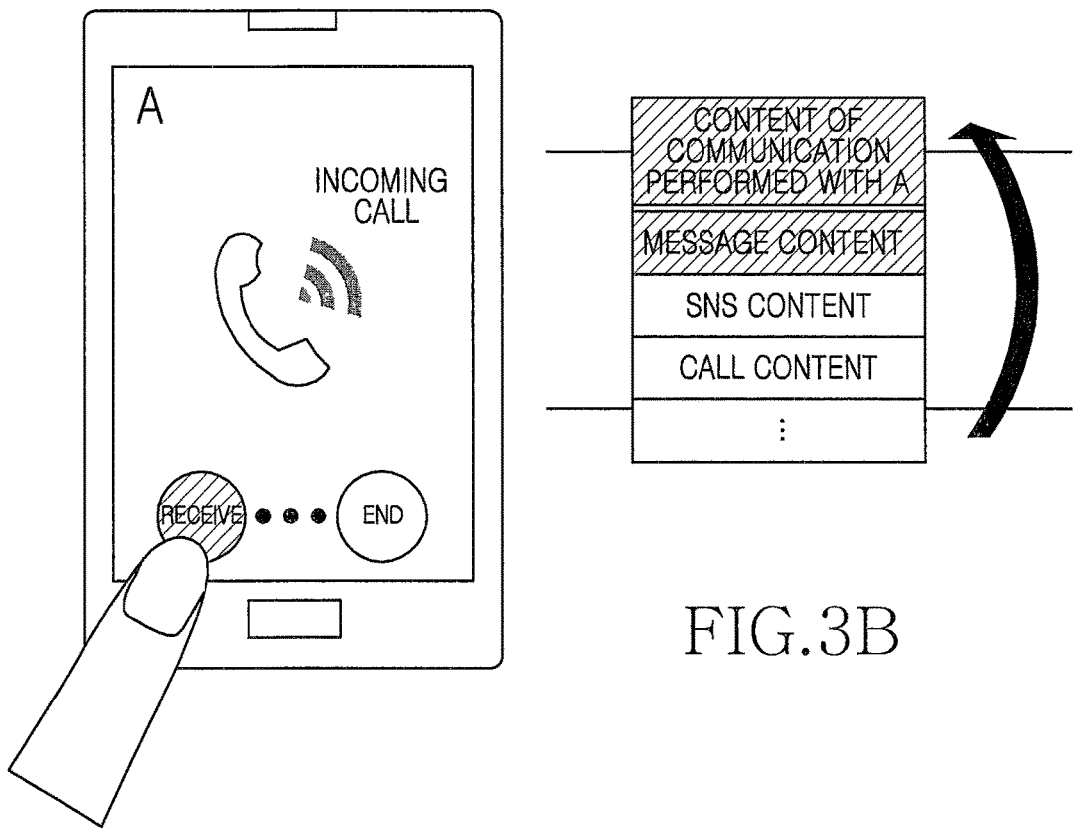
FIG.3A
FIG.3B
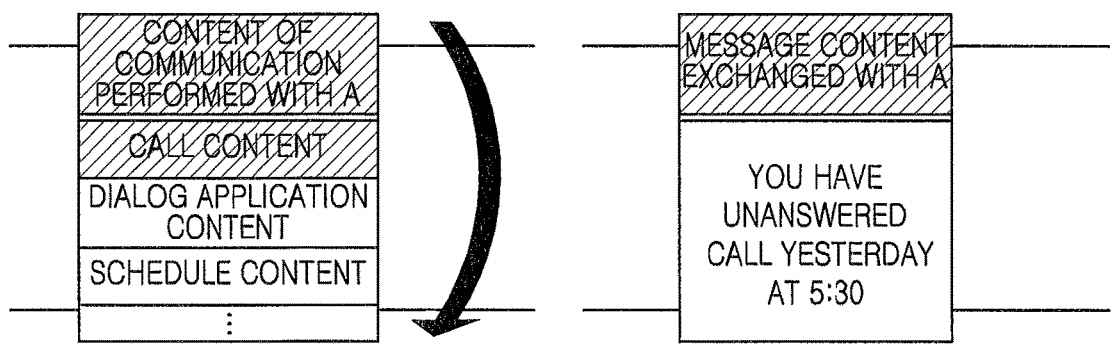
FIG.3C
FIG.3D

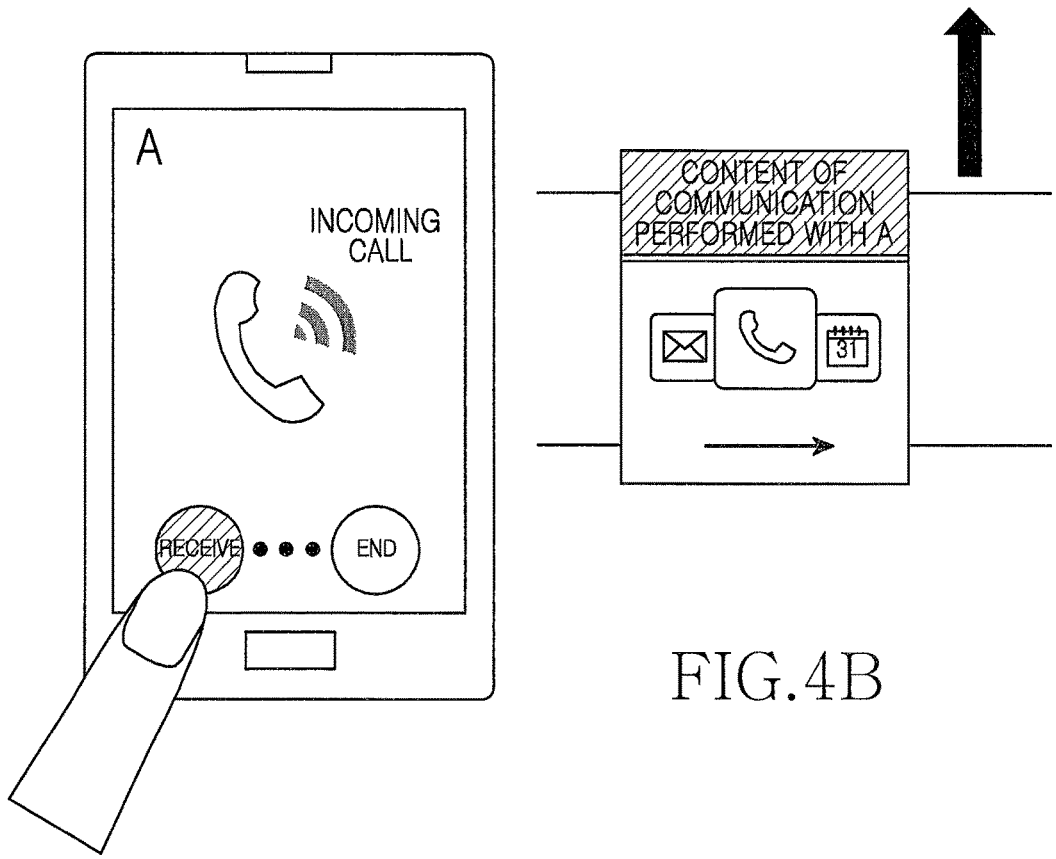
FIG.4A
FIG.4B
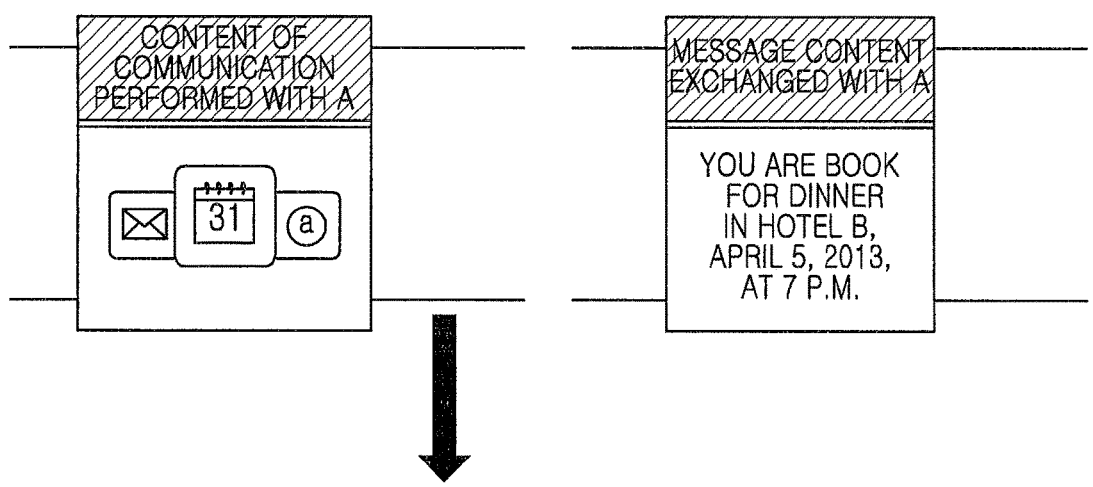
FIG.4C
FIG.4D

| CONTENT OF COMMUNICATION PERFORMED WITH A | |
|---|---|
| ✉ | TOMORROW, 2 P.M., MEETING ROOM |
| ☏ | YESTERDAY, 5:30 P.M., UNANSWERED CALL |
| 📅 | APRIL, 5, 2013, 5:30 |

FIG.6A

| CONTENT OF COMMUNICATION PERFORMED WITH A | |
|---|---|
| ✉ | 2 P.M., MEETING ROOM, MEETING |
| ☏ | 5:30 P.M., UNANSWERED |
| 📅 | APRIL, 5, 5 P.M., B HOTEL |

FIG.6B

| CONTENT OF COMMUNICATION PERFORMED WITH A | |
|---|---|
| ✉ | 2 P.M., MEETING ROOM, MEETING RESERVED |
| ☏ | 5:30, UNANSWERED CALL |
| 📅 | DINNER RESERVED AT |

FIG.6C

| CONTENT OF COMMUNICATION PERFORMED WITH A | |
|---|---|
| ✉ | MEETING ROOM, MEETING RESERVED |
| ☏ | UNANSWERED CALL |
| 📅 | DINNER RESERVED |

FIG.6D

ELECTRONIC DEVICE FOR DETECTING INFORMATION OF PERSON ON THE OTHER END OF CALL AND METHOD THEREOF

PRIORITY

The present application is related to and claims the benefit under 35 U.S.C. § 119(a) of a Korean patent application filed in the Korean Intellectual Property Office on Jun. 3, 2013 and assigned Serial No. 10-2013-0063545, the entire disclosure of which is hereby incorporated by reference.

TECHNICAL FIELD

The present disclosure relates to an electronic device for detecting information of a person on the other end of a call and a method thereof.

BACKGROUND

When intending to search for content of communication performed which a person on the other end of a call and stored in an electronic device during the call, everyone may have an experience that it is inconvenient to search for the content of communication while making a call by using one electronic device.

Conventionally, it has been tried to solve the aforementioned inconvenience problem by employing a second electronic device synchronized with an electronic device and placed on a wrist or the like of a user. However, it has a limitation in that only basic content (e.g., a name of a person on the other end of a call and text message content) is confirmed through the second electronic device.

Accordingly, there is an urgent need for an electronic device capable of improving user convenience and a method thereof by providing a variety of data related to a person on the other end of a call to the second electronic device.

SUMMARY

To address the above-discussed deficiencies, it is a primary object to provide an apparatus and method for solving a user inconvenience problem by using a second electronic device synchronized with an electronic device to automatically confirm a variety of information related to a person on the other end of a call.

Another aspect of the present disclosure is to provide an apparatus and method capable of improving user convenience by detecting a gesture configured in a second electronic device so that a plurality of pieces of communication content displayed in a touch screen of the second electronic device can be selectively confirmed.

In accordance with one aspect of the present disclosure, a method of detecting information of a person on the other end of a call includes receiving a call requested from a third electronic device is provided. The method includes detecting information related to the third electronic device, and transmitting data regarding the detected information to the second electronic device.

Preferably, the information related to the third electronic device may be at least one of message content, e-mail content, a call record, dialog application content, Social Network Service (SNS) content, and schedule content.

Preferably, the detecting of the information related to the third electronic device may include determining whether a time of detecting the information related to the third electronic device is pre-set, and if it is determined that the time of detecting the information related to the third electronic device is pre-set, detecting the information related to the third electronic device within the pre-set time.

In accordance with another aspect of the present disclosure, a method of operating a second electronic device synchronized with a first electronic device is provided. The method includes displaying at least one information related to a third electronic device according to a pre-set order, and upon detecting a pre-set gesture, displaying full content related to one of the at least one information.

Preferably, the method may further include receiving data regarding information related to the third electronic device from the first electronic device.

Preferably, the information related to the third electronic device may be at least one of message content, e-mail content, a call record, dialog application content, SNS content, and schedule content.

Preferably, the displaying of the at least one information related to the third electronic device according to the pre-set order may include determining whether an order of priority for displaying the at least one piece of information related to the third electronic device is pre-set, and if it is determined that the order of priority is pre-set, according to the pre-set order of priority, displaying the at least one piece of information related to the third electronic device in descending order of priority.

Preferably, the method may further include selecting any one of the at least one piece of information related to the third electronic device and displayed according to the pre-set order by detecting a pre-set first gesture.

Preferably, the selecting of the any one of the at least one piece of information related to the third electronic device and displayed according to the pre-set order by detecting the pre-set first gesture may include, if it is detected that the pre-set first gesture is detected, sequentially selecting any one of the at least one piece of information related to the third electronic device and displayed according to the pre-set order whenever the pre-set first gesture is detected.

Preferably, the gesture may be a second gesture for displaying full content related to any one piece of information among the at least one piece of information.

In accordance with another aspect of the present disclosure, a first electronic device synchronized with a second electronic device is provided. The first electronic device includes a communication module for receiving a call requested from a third electronic device, and for transmitting detected information to the second electronic device, and a processor unit for detecting information related to the third electronic device.

Preferably, the information related to the third electronic device may be at least one of message content, e-mail content, a call record, dialog application content, SNS content, and schedule content.

Preferably, the processor unit may determine whether a time of detecting the information related to the third electronic device is pre-set, and if it is determined that the time of detecting the information related to the third electronic device is pre-set, may detect the information related to the third electronic device within the pre-set time.

In accordance with another aspect of the present disclosure, a second electronic device synchronized with a first electronic device is provided. The second electronic device includes a touch screen for displaying at least one information related to a third electronic device according to a pre-set order, and upon detecting a pre-set gesture, displaying an entire content related to one of the at least one information, and a processor unit for controlling data detected in the touch screen.

Preferably, the second electronic device may further include a communication module for receiving data regarding information related to the third electronic device from the first electronic device.

Preferably, the information related to the third electronic device may be at least one of message content, e-mail content, a call record, dialog application content, SNS content, and schedule content.

Preferably, the processor unit may determine whether an order of priority for displaying the at least one piece of information related to the third electronic device is pre-set. If it is determined that the order of priority is pre-set, according to the pre-set order of priority, the touch screen may display the at least one piece of information related to the third electronic device in descending order of priority.

Preferably, the processor unit may select any one of the at least one piece of information related to the third electronic device and displayed according to the pre-set order by detecting a pre-set first gesture.

Preferably, if it is detected that the pre-set first gesture is detected, the processor unit may sequentially select any one of the at least one piece of information related to the third electronic device and displayed according to the pre-set order whenever the pre-set first gesture is detected.

Preferably, the gesture may be a second gesture for displaying full content related to any one piece of information among the at least one piece of information.

Before undertaking the DETAILED DESCRIPTION below, it may be advantageous to set forth definitions of certain words and phrases used throughout this patent document: the teens "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A, 3B, 3C and 3D illustrate an example where a second electronic device displays full call content in information related to a third electronic device according to an exemplary embodiment of the present disclosure;

FIGS. 4A, 4B, 4C and 4D illustrate an example where a second electronic device displays full schedule content in information related to a third electronic device according to an exemplary embodiment of the present disclosure;

FIGS. 6A, 6B, 6C and 6D illustrate an example where a second electronic device displays information related to a third electronic device according to an exemplary embodiment of the present disclosure;

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on the user's or operator's intension and usage. That is, the terms used herein must be understood based on the descriptions made herein.

Figure 1:
FIG. 1 illustrates an electronic device which detects information of a person on the other end of a call according to an exemplary embodiment of the present disclosure.

FIG. 1 illustrates an electronic device which detects information of a person on the other end of a call according to an exemplary embodiment of the present disclosure. As illustrated in FIG. 1, the electronic device may be a first electronic device 101 which may attempt a call to a third electronic device and a second electronic device 102 which may be placed on a specific part of a user's body. Hereinafter, the present disclosure will be described in detail by assuming an example where the first electronic device 101 receives a call reception requested from the third electronic device.

First, if the first electronic device 101 receives a call requested from the third electronic device, the first electronic device 101 may detect the information related to the third electronic device. Herein, the information related to the third electronic device may be defined as at least one of message content, e-mail content, a call record, dialog application content, Social Network Service (SNS) content, and schedule content. More specifically, the information related to the third electronic device may be message content exchanged mutually between the first electronic device and the third electronic device, e-mail content, dialog content using a dialog application, dialog content using an SNS, schedule content agreed with a user of the third electronic device, etc. That is, the first electronic device 101 may detect message content exchanged with the third electronic device which receives a call, e-mail content, a call record, dialog application content, SNS content, scheduling content, etc.

If it is determined that a time range for detecting the information related to the third electronic device is pre-set in the first electronic device 101, the first electronic device may detect the information related to the third electronic device within the pre-set time. For example, if it is assumed that the time range for detecting the information related to the third electronic device is one week in the first electronic device 101, the first electronic device 101 may detect information within a range of one week in the information related to the third electronic device.

Thereafter, the first electronic device 101 may transmit data regarding the detected information related to the third electronic device to the second electronic device. Herein, since the first electronic device 101 and the second electronic device 102 are mutually synchronized, the first electronic device 101 may transmit the data regarding the detected information related to the third electronic device to the second electronic device 102. More specifically, the data regarding the information related to the third electronic device may be transmitted automatically from the first electronic device 101 to the second electronic device 102, and upon receiving a request for transmitting specific data from the second electronic device 102, the first electronic device 101 may transmit requested data to the second electronic device 102. In addition, upon receiving an input of a command for transmitting specific data to the second electronic device 102, the first electronic device 101 may transmit the specific data to the second electronic device 102.

The second electronic device 102 is mutually synchronized with the first electronic device 101, and thus may receive data related to the third electronic device on the call from the first electronic device 101. More specifically, the second electronic device 102 may receive from the first electronic device 101 message content which is information related to the third electronic device on the call, e-mail content, a call record, dialog application content, SMS content, schedule content, etc.

Thereafter, the second electronic device 102 may display at least one piece of information related to the third electronic device according to a pre-set order. More specifically, if it is determined that an order of priority of displaying the at least one piece of information related to the third electronic device is pre-set in the second electronic device 102, according to the pre-set order of priority, the second electronic device 102 may display the at least one piece of information related to the third electronic device in a touch screen in descending order of priority.

For example, it is assumed that the second electronic device 102 is configured to display content of communication in descending order of an amount of communication content unconfirmed in the first electronic device 101. In addition, it is also assumed that three unanswered calls incoming from the third electronic device are not confirmed in the first electronic device 101, and two messages received from the third electronic device are not confirmed. In the aforementioned assumption, since the three unanswered calls are greater in number than two unconfirmed messages, the second electronic device 102 may display communication content in a touch screen of the second electronic device 102 in an order of the call content and the message content.

Thereafter, the second electronic device 102 may detect a pre-set first gesture, and thus may select any one of at least one piece of information related to the third electronic device, displayed according to a pre-set order. More specifically, if it is determined that the pre-set first gesture is detected, the second electronic device 102 may sequentially select any one of the at least one piece of information related to the third electronic device, displayed according to the pre-set order whenever the pre-set gesture is detected. For example, it is assumed that "message content, SNS content, and call content" transmitted and received with respect to the third electronic device are displayed in that order in the touch screen of the second electronic device 102, and a user of the first electronic device 101 and the second electronic device 102 intends to confirm specific call content. In addition, it is assumed that the first gesture capable of selecting the communication content in the second electronic device 102 is a gesture which moves by a pre-set angle in a clockwise direction.

In the aforementioned assumption, if the first gesture which moves by the pre-set angle in the clockwise direction is detected once, the second electronic device 102 may select communication content of "SNS content" from communication content of "message content" currently displayed in an uppermost portion of the touch screen of the second electronic device 102. Thereafter, if the first gesture which moves by the pre-set angle in the clockwise direction is detected one more time, the second electronic device 102 may select communication content of "call content" from communication content of "SNS content" currently displayed in the uppermost portion of the touch screen of the second electronic device 102.

Thereafter, if a pre-set second gesture is detected, the second electronic device 102 may display full content of the selected any one piece of content related to the third electronic device. More specifically, the second electronic device 102 determines whether the pre-set second gesture is detected, and if it is determined that the pre-set second gesture is detected, may display the full content of any one piece of content related to the third electronic device and selected through the first gesture in the touch screen of the second electronic device 102. For example, it is assumed that "call content, message content, and e-mail content" transmitted and received with respect to the third electronic device are displayed in that order in the touch screen of the second electronic device 102, and a user of the first electronic device 101 and the second electronic device 102 intends to confirm specific call content. In addition, it is assumed that a second gesture which indicates to display full communication content in the second electronic device 102 is a gesture which moves by a pre-set angle in a counterclockwise direction.

In the aforementioned assumption, if the second gesture which moves by the pre-set angle in the counter-clockwise direction is detected, the second electronic device 102 may display full content of "call content", which is currently displayed in an uppermost portion of the touch screen of the second electronic device 102, in the touch screen of the second electronic device 102. That is, the second electronic device 102 may display an unanswered call and full call content with respect to the third electronic device within a pre-set time such as a call time, etc., in the touch screen of the second electronic device 102.

Although it is described in the aforementioned embodiment that the second electronic device 102 sequentially detects the first gesture and the second gesture for example, it is apparent that the second gesture may be directly detected in the second electronic device 102 without having to detect the first gesture. That is, this is because the second electronic device 102 may directly detect the second gesture without having to detect the first gesture if the user of the second electronic device 102 does not have to select specific content to be confirmed in the information related with the third electronic device and displayed in the touch screen of the second electronic device 102.

In addition, although it is described in the aforementioned exemplary embodiment that the second electronic device 102 may confirm specific information related to the third electronic device by detecting the first gesture or the second gesture, the information related to the third electronic device may be displayed in the touch screen of the second electronic device 102 under the control of the first electronic device 101. For example, the first electronic device 101 may directly control the second electronic device 102 upon receiving from the user an input of a command for displaying the information related to the third electronic device in the touch screen of the second electronic device 102.

In addition, although it is described in the aforementioned exemplary embodiment that the third electronic device and the first electronic device 101 perform mutual communication, since the first electronic device 101 and the second electronic device 102 are mutually synchronized, the second electronic device 102 may communicate with the third electronic device via the first electronic device 101. For example, the second electronic device 102 may communicate with the third electronic device via the first electronic device 101 while displaying the information related to the third electronic device.

Conventionally, it has been tried to solve the aforementioned inconvenience problem by employing a second electronic device synchronized with an electronic device and placed on a wrist or the like of a user. However, during a call, it has a limitation in that only basic content such as text message content is confirmed through the second electronic device if a text message and a name of the person on the other end of the call are received.

However, the second electronic device 102 according to the present disclosure advantageously improves user convenience by displaying full information related to the third electronic device on the call in the touch screen of the second electronic device 102. In addition, the user may easily confirm a variety of information related to the third electronic device in such a manner that one of two hands of the user attempts a call to the third electronic device by using the first electronic device 101 while the second electronic device 102 is placed on a wrist or the like of the other hand. More specifically, upon detecting the pre-set first gesture and the pre-set second gesture, the second electronic device 102 displays information of interest in the touch screen of the second electronic device 102 by receiving the information selected from a user whose two hands are not free, thereby advantageously performing a user friendly function.

Figure 2A:
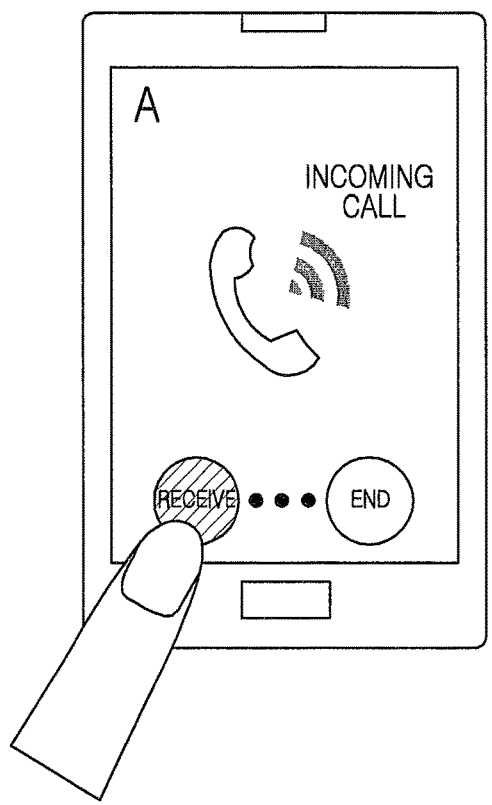
FIGS. 2A, 2B, 2C and 2D illustrate an example where a second electronic device displays full content of a message included in content of communication performed with a third electronic device according to an exemplary embodiment of the present disclosure.

FIGS. 2A, 2B, 2C and 2D illustrate an example where a second electronic device displays full content of a message included in content of communication performed with a third electronic device according to an exemplary embodiment of the present disclosure. First, as illustrated in FIG. 2A, at the request of a call reception from the third electronic device, a first electronic device may receive the requested call. Herein, a phone number of the third electronic device may be a number stored in the first electronic device, or may be a number not stored in the first electronic device.

Thereafter, the first electronic device may detect a variety of information related to the third electronic device. That is, the first electronic device may detect a variety of information such as message content exchanged mutually between the first electronic device and the third electronic device, e-mail content, dialog content using a dialog application, dialog content using an SNS, schedule content agreed with a user of the third electronic device, etc.

Thereafter, the first electronic device may transmit data regarding the detected information related to the third electronic device to the second electronic device. Herein, since the first electronic device and the second electronic device are mutually synchronized, the first electronic device may transmit the data regarding the detected information related to the third electronic device to the second electronic device.

Figure 2B:
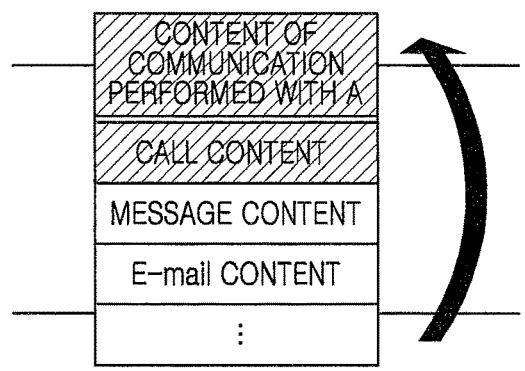

Thereafter, as illustrated in FIG. 2B, the second electronic device may receive the data regarding the information related to the third electronic device, and may display at least one piece of information related to the third electronic device according to a pre-set order. More specifically, if it is determined that an order of priority of displaying the at least one piece of information related to the third electronic device is pre-set in the second electronic device, according to the order of priority, the second electronic device may display the at least one piece of information in a touch screen in descending order of priority.

Thereafter, the second electronic device may detect a pre-set first gesture, and thus may select any one of at least one piece of information related to the third electronic device, displayed according to a pre-set order. More specifically, if it is determined that the pre-set first gesture is detected, the second electronic device may sequentially select any one of the at least one piece of information related to the third electronic device, displayed according to the pre-set order whenever the pre-set gesture is detected.

For example, as illustrated in FIG. 2B, it is assumed that "call content, message content, and e-mail content" transmitted and received with respect to the third electronic device are displayed in that order in a touch screen of the second electronic device, and the user of the first electronic device and the second electronic device intends to confirm specific call content. In addition, it is assumed that the first gesture capable of selecting the communication content in the second electronic device is a gesture which moves by a pre-set angle in a clockwise direction.

In the aforementioned assumption, if the first gesture which moves by the pre-set angle in the clockwise direction is detected once, the second electronic device may select information of "message content" from information of "call content" in the information related to the third electronic device currently displayed in an uppermost portion of the touch screen of the second electronic device.

Figure 2C:
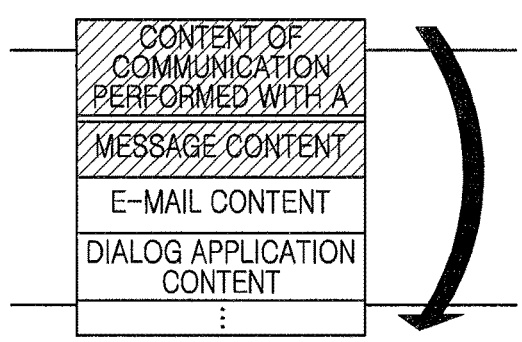

Thereafter, as illustrated in FIG. 2C, if a pre-set second gesture is detected, the second electronic device may display the entirety of selected any one piece of information. More specifically, the second electronic device determines whether the pre-set second gesture is detected, and if it is determined that the pre-set second gesture is detected, may display the entirety of any one piece of information selected through the first gesture in the touch screen of the second electronic device. For example, as illustrated in FIG. 2C, the second gesture which moves by a pre-set angle in a counter-clockwise direction may be detected in a state where information of "message content" is selected by detecting the first gesture once in the second electronic device.

Figure 2D:
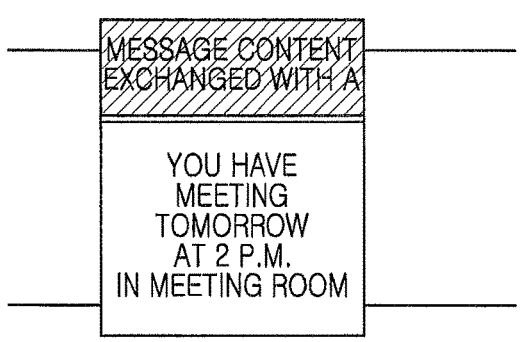

Thereafter, as illustrated in FIG. 2D, the second electronic device may display the entirety of information of "message content" displayed in the uppermost portion of the touch screen of the second electronic device. For example, the second electronic device may display in the touch screen of the second electronic device specific content of a message such as "You have a meeting tomorrow at 2 p.m. in a meeting room." received within a time which is set with respect to a user A of the third electronic device.

Therefore, the user of the first electronic device and the second electronic device may rapidly confirm content of communication performed with the user of the third electronic device by using the second electronic device placed on a wrist or the like during a call with the user of the third electronic device by using the first electronic device, thereby advantageously improving user convenience. In addition, upon detecting the pre-set first gesture and the pre-set second gesture, the second electronic device displays information of interest in the touch screen of the second electronic device by receiving the information selected from a user whose two hands are not free, thereby advantageously performing a user friendly function.

FIGS. 3A, 3B, 3C and 3D illustrate an example where a second electronic device displays full call content in information related to a third electronic device according to an exemplary embodiment of the present disclosure. First, as illustrated in FIG. 3A, at the request of a call reception from the third electronic device, a first electronic device may receive the requested call. Herein, a phone number of the third electronic device may be a number stored in the first electronic device, or may be a number not stored in the first electronic device.

Thereafter, the first electronic device may detect the information related to the third electronic device. More specifically, the first electronic device may confirm that the call requested from the third electronic device is received, and thereafter may detect all various pieces of information related to the third electronic device.

Thereafter, the first electronic device may transmit data regarding the detected information related to the third electronic device to the second electronic device. Herein, since the first electronic device and the second electronic device are mutually synchronized, the first electronic device may transmit the data regarding the detected information related to the third electronic device to the second electronic device.

Thereafter, as illustrated in FIG. 3B, the second electronic device may receive the data regarding the information related to the third electronic device from the first electronic device, and may display at least one piece of information according to a pre-set order. More specifically, if it is determined that an order of priority of displaying the at least one piece of information related to the third electronic device is pre-set in the second electronic device, according to the order of priority, the second electronic device may display the at least one piece of information related to the third electronic device in the touch screen of the second electronic device in descending order of priority.

Thereafter, the second electronic device may detect a pre-set first gesture, and thus may select any one of at least one piece of information related to the third electronic device, displayed according to the pre-set order. More specifically, if it is determined that the pre-set first gesture is detected, the second electronic device may sequentially select any one of the at least one piece of information related to the third electronic device, displayed according to the pre-set order whenever the pre-set gesture is detected. For example, as illustrated in FIG. 3B, it is assumed that "message content, SNS content, and call content" transmitted and received with respect to the third electronic device are displayed in that order in a touch screen of the second electronic device, and the user of the first electronic device and the second electronic device intends to confirm specific call content. In addition, it is assumed that the first gesture capable of selecting the information related to the third electronic device in the second electronic device is a gesture which moves by a pre-set angle in a clockwise direction.

In the aforementioned assumption, if the first gesture which moves by the pre-set angle in the clockwise direction is detected twice, the second electronic device may select information of "call content" from the information related to the third electronic device, i.e., information of "message content" currently displayed in an uppermost portion of the touch screen of the second electronic device.

Thereafter, as illustrated in FIG. 3C, if a pre-set second gesture is detected, the second electronic device may display the entirety of selected any one piece of information in a specific manner. More specifically, the second electronic device determines whether the pre-set second gesture is detected, and if it is determined that the pre-set second gesture is detected, may use the first gesture to display the entirety of selected any one piece of information related to the third electronic device. For example, as illustrated in FIG. 3C, the second gesture which moves by a pre-set angle in a counter-clockwise direction may be detected in a state where information of "message content" is selected upon detecting the first gesture twice in the second electronic device.

Thereafter, as illustrated in FIG. 3D, the second electronic device may display full content of information of "call content" displayed in the uppermost portion of the touch screen of the second electronic device. For example, the second electronic device may display in the touch screen of the second electronic device specific call content of "You have an unanswered call at 5:30 p.m. yesterday." indicating that there is an unanswered call from the third electronic device. Therefore, the user of the first electronic device and the second electronic device confirms that there was an unanswered call yesterday during a call with the user A of the third electronic device, and thus may naturally continue to have a conversation with the user A.

FIGS. 4A, 4B, 4C and 4D illustrate an example where a second electronic device displays full schedule content in information related to a third electronic device according to an exemplary embodiment of the present disclosure. First, as illustrated in FIG. 4A, at the request of a call reception from the third electronic device, a first electronic device may receive the requested call. Herein, a phone number of the third electronic device may be a number stored in the first electronic device, or may be a number not stored in the first electronic device.

Thereafter, the first electronic device may detect the information related to the third electronic device. More specifically, the first electronic device may confirm that the call requested from the third electronic device is received, and thereafter may detect all various pieces of information related to the third electronic device. Thereafter, the first electronic device may transmit data regarding the detected information related to the third electronic device to the second electronic device. Herein, since the first electronic device and the second electronic device are mutually synchronized, the first electronic device may transmit the data regarding the detected information related to the third electronic device to the second electronic device.

Thereafter, as illustrated in FIG. 4B, the second electronic device may receive data regarding the information related to the third electronic device from the first electronic device, and may display at least one piece of information according to a pre-set order. More specifically, if it is determined that an order of priority of displaying the at least one piece of information related to the third electronic device is pre-set in the second electronic device, according to the order of priority, the second electronic device may display at least one communication content in the touch screen of the second electronic device in descending order of priority.

Thereafter, the second electronic device may detect a pre-set first gesture, and thus may select any one of at least one piece of information related to the third electronic device, displayed according to a pre-set order. More specifically, if it is determined that the pre-set first gesture is detected, the second electronic device may sequentially select any one of the at least one piece of information related to the third electronic device, displayed according to the pre-set order whenever the pre-set gesture is detected.

Herein, the information related to the third electronic device and displayed in the second electronic device may be displayed in an icon form. For example, as illustrated in FIG. 4B, it is assumed that "a message icon including message content, a call icon including call content, and a schedule icon including scheduling content" are displayed in the touch screen of the second electronic device, and the user of the first electronic device and the second electronic device intents to confirm specific schedule content. In addition, it is also assumed that a first gesture capable of selecting the information related to the third electronic device in the second electronic device is a gesture which moves by a pre-set angle in an upward direction.

In the aforementioned assumption, if the first gesture which moves by the pre-set angle in the upward direction is detected once, the second electronic device may select information of a "schedule icon" from a "call icon" currently displayed in a center portion of the touch screen of the second electronic device.

Thereafter, as illustrated in FIG. 4C, if a pre-set second gesture is detected, the second electronic device may display full content of any one piece of information selected from the information related to the third electronic device. More specifically, the second electronic device determines whether the pre-set second gesture is detected, and if it is determined that the pre-set second gesture is detected, may use the first gesture to display the full content of any one piece of information selected from the information related to the third electronic device in the touch screen of the second electronic device. For example, as illustrated in FIG. 4C, the second gesture which moves by a pre-set angle in a downward direction may be detected in a state where a "schedule icon" is selected by detecting the first gesture once in the second electronic device.

Thereafter, as illustrated in FIG. 4D, the second electronic device may display full schedule content included in the "schedule icon" displayed in the center portion of the touch screen of the second electronic device. For example, the second electronic device may display specific schedule content of "You are booked for dinner in the hotel B, Apr. 5, 2013, at 7 p.m." which is schedule content with respect to the user of the third electronic device in the touch screen of the second electronic device.

Herein, the schedule content may be stored by the user of the first electronic device and the second electronic device while communication is achieved with the user of the third electronic device, or may be manually input directly to the first electronic device. For example, the user of the first electronic device and the second electronic device may transmit and receive a message with respect to the user of the third electronic device, and thereafter may copy a part of "You are booked for dinner in the hotel B, Apr. 5, 2013, at 7 p.m." which is schedule content and may store the schedule content to a scheduler of the first electronic device.

Figure 5A:
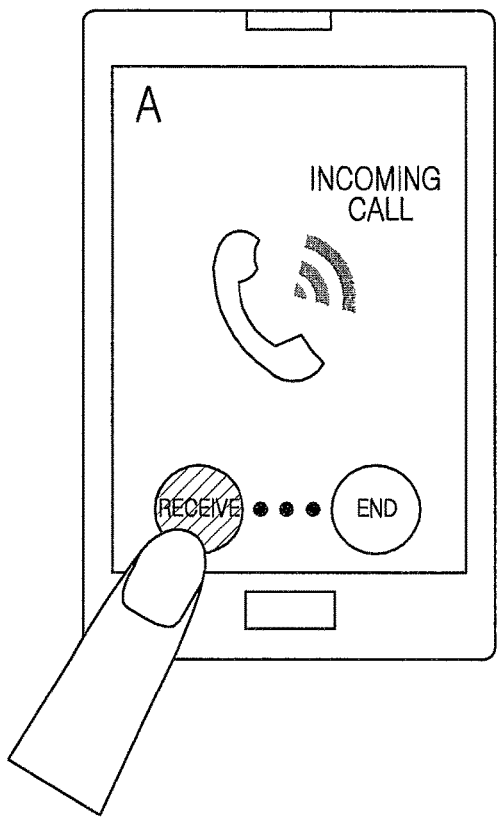
FIGS. 5A, 5B, 5C and 5D illustrate an example where a second electronic device displays full schedule content in information related to a third electronic device according to another exemplary embodiment of the present disclosure.

FIGS. 5A, 5B, 5C and 5D illustrate an example where a second electronic device displays full schedule content in information related to a third electronic device according to another exemplary embodiment of the present disclosure. First, as illustrated in FIG. 5A, at the request of a call reception from the third electronic device, a first electronic device may receive the requested call. Herein, a phone number of the third electronic device may be a number stored in the first electronic device, or may be a number not stored in the first electronic device.

Thereafter, the first electronic device may detect the information related to the third electronic device. More specifically, the first electronic device may confirm that the call requested from the third electronic device is received, and thereafter may detect all various pieces of information related to the third electronic device. Thereafter, the first electronic device may transmit data regarding the detected information related to the third electronic device to the second electronic device. Herein, since the first electronic device and the second electronic device are mutually synchronized, the first electronic device may transmit the data regarding the detected information related to the third electronic device to the second electronic device.

Figure 5B:
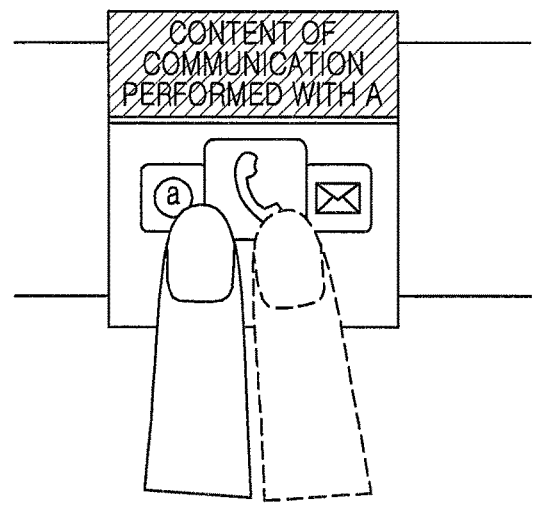

Thereafter, as illustrated in FIG. 5B, the second electronic device may receive data regarding the information related to the third electronic device from the first electronic device, and may display at least one piece of information according to a pre-set order. More specifically, if it is determined that an order of priority of displaying the at least one piece of information related to the third electronic device is pre-set in the second electronic device, according to the order of priority, the second electronic device may display at least one piece of information related to the third electronic device in the touch screen of the second electronic device in descending order of priority.

Thereafter, the second electronic device may detect a pre-set first gesture, and thus may select any one of the at least one piece of information related to the third electronic device, displayed according to a pre-set order. More specifically, if it is determined that the pre-set first gesture is detected, the second electronic device may sequentially select any one of the at least one piece of information related to the third electronic device, displayed according to the pre-set order whenever the pre-set gesture is detected.

Herein, the information related to the third electronic device and displayed in the second electronic device may be displayed in an icon form. For example, as illustrated in FIG. 5B, it is assumed that "an e-mail icon including e-mail content, a call icon including call content, and a message icon including message content" are displayed in the touch screen of the second electronic device, and the user of the first electronic device and the second electronic device intents to confirm specific message content. In addition, it is also assumed that a first gesture capable of selecting the information related to the third electronic device in the second electronic device is a drag gesture.

In the aforementioned assumption, upon detecting the first gesture which is a drag for moving displayed icons in a left direction, the second electronic device may select information of a "message icon" from a "call icon" currently displayed in a center portion of the touch screen of the second electronic device.

Figure 5C:
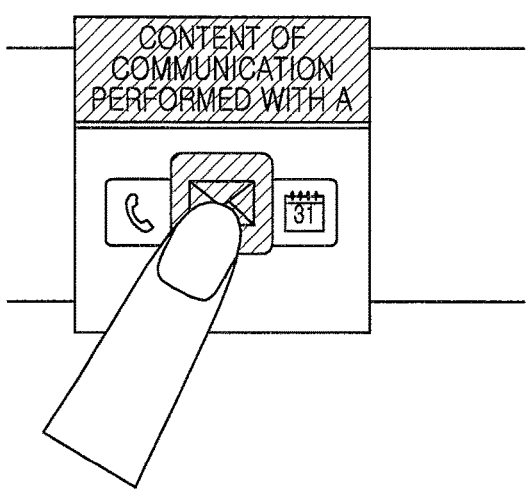

Thereafter, as illustrated in FIG. 5C, upon detecting a pre-set gesture, the second electronic device may display full content of selected any one piece of information. More specifically, the second electronic device determines whether the pre-set second gesture is detected, and if it is determined that the pre-set second gesture is detected, the second electronic device may use the first gesture to display the full content of any one piece of information selected from the information related to the third electronic device in the touch screen of the second electronic device. For example, as illustrated in FIG. 5C, the second gesture for which a touch input is made in a state where a "message icon" is selected may be detected by detecting the first gesture once in the second electronic device.

Figure 5D:
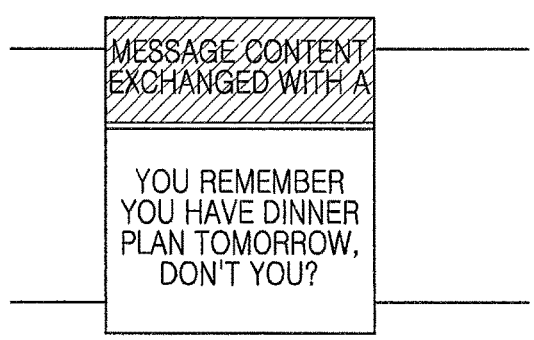

Thereafter, as illustrated in FIG. 5D, the second electronic device may display full schedule content included in the "message icon" displayed in the center portion of the touch screen of the second electronic device. For example, the second electronic device may display specific message content such as "You remember you have a dinner plan tomorrow, don't you?" which is message content received from the third electronic device in the touch screen of the second electronic device.

FIGS. 6A, 6B, 6C and 6D illustrate an example where a second electronic device displays information related to a third electronic device according to an exemplary embodiment of the present disclosure.

First, it is assumed that a first electronic device is currently on a call with the third electronic device, and the first electronic device and the second electronic device are mutually synchronized to be able to transmit and receive data.

In the aforementioned assumption, the second electronic device may receive data regarding the information related to the third electronic device from the first electronic device, and may display at least one piece of information according to a pre-set order. More specifically, if it is determined that an order of priority of displaying the at least one piece of information related to the third electronic device is pre-set in the second electronic device, according to the order of priority, the second electronic device may display at least one piece of information related to the third electronic device in the touch screen of the second electronic device in descending order of priority.

Herein, the second electronic device may display the information related to the third electronic device in an icon form, or may display the information in a title form of the information, and may display full content of the information in a touch screen. For example, it is assumed that an order of priority is pre-set in an order of message content, call content, and schedule content in content of communication performed between the first electronic device and the third electronic device. In addition, it is also assumed that the second electronic device is configured to display full content of communication performed between the first electronic device and the third electronic device in a touch screen.

In the aforementioned assumption, the second electronic device may display content of communication performed with respect to the third electronic device within a pre-set time in the touch screen of the second electronic device regarding full content in an order of message content, call content, and schedule content according to the pre-set order of priority. For example, as illustrated in FIGS. 6A to 6D, the second electronic device may display a message such as "You have a meeting tomorrow at 2 p.m. in a meeting room." as message content. In addition, the second electronic device may display call content such as "You have an unanswered call yesterday at 5:30 p.m." and schedule content such as "You are booked for dinner in the hotel B, Apr. 5, 2013 at 5:30 p.m." at a line immediately below the message content in the touch screen of the second electronic device.

That is, as described in the aforementioned exemplary embodiment, if the second electronic device is configured to display full content of communication performed between the first electronic device and the third electronic device in the touch screen, the second electronic device may display the full content of communication according to a pre-set order without having to detect the first gesture and the second gesture, thereby advantageously improving user convenience.

Figure 7A:
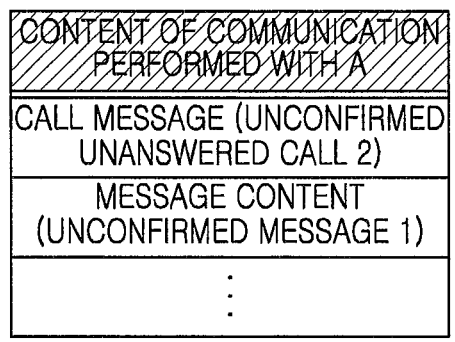
FIGS. 7A, 7B and 7C illustrate an example where a second electronic device displays content of communication performed with respect to a third electronic device in a pre-set order of priority according to an exemplary embodiment of the present disclosure.
Figure 7B:
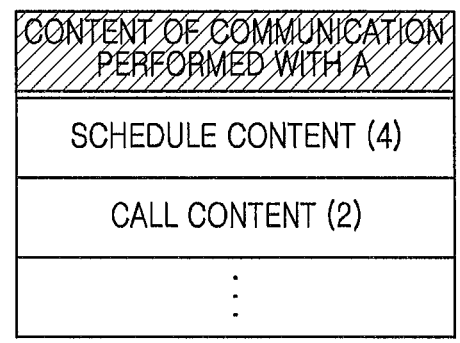
Figure 7C:
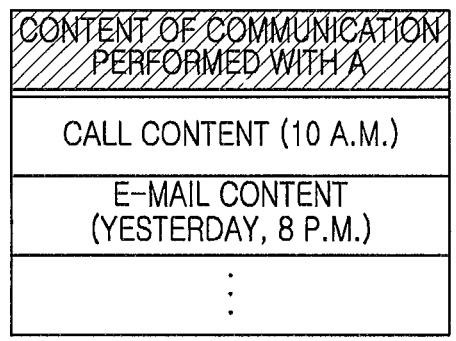

FIGS. 7A, 7B and 7C illustrate an example where a second electronic device displays content of communication performed with respect to a third electronic device in a pre-set order of priority according to an exemplary embodiment of the present disclosure. First, the second electronic device may display at least one piece of content of communication performed between the first electronic device and the second electronic device according to a pre-set order. More specifically, if it is determined that an order of priority of displaying the at least one communication content is pre-set, according to the pre-set order of priority, the second electronic device may display the at least one communication content in a touch screen of the second electronic device in descending order of priority.

For example, as illustrated in FIG. 7A, it is assumed that the second electronic device is configured to display communication content in descending order of an amount of communication content unconfirmed in the first electronic device. In addition, it is also assumed that two unanswered calls incoming from the third electronic device are not confirmed in the first electronic device, and one message received from the third electronic device is not confirmed. In the aforementioned assumption, since the two unanswered calls are greater in number than one unconfirmed message, the second electronic device may display the communication content in the touch screen of the second electronic device in an order of "call content and message content".

For another example, as illustrated in FIG. 7B, it is assumed that the second electronic device is configured to display communication content in descending order of the number of times of performing communication between the first electronic device and the third electronic device. In addition, it is also assumed that four pieces of schedule content related to a user of the third electronic device are stored in the first electronic device, and there are two pieces of call content with respect to the third electronic device. In the aforementioned assumption, since the four pieces of schedule content related to the user of the third electronic device are greater in number than the two pieces of call content with respect to the third electronic device, communication content may be displayed in the touch screen of the second electronic device in an order of "scheduling content and call content".

For another example, as illustrated in FIG. 7C, it is assumed that the second electronic device is configured to display communication content in an order of time for performing communication between the first electronic device and the third electronic device. In addition, it is also assumed that the first electronic device has content of calling to the third electronic device today at 10 a.m., and transmits and receives an e-mail with respect to the third electronic device yesterday at 8:00 p.m. In the aforementioned assumption, since a time of calling to the third electronic device is earlier than a time of transmitting and receiving an e-mail with respect to the third electronic device, the second electronic device may display communication content in the touch screen of the second electronic device in an order of "call content and e-mail content".

Figure 8:
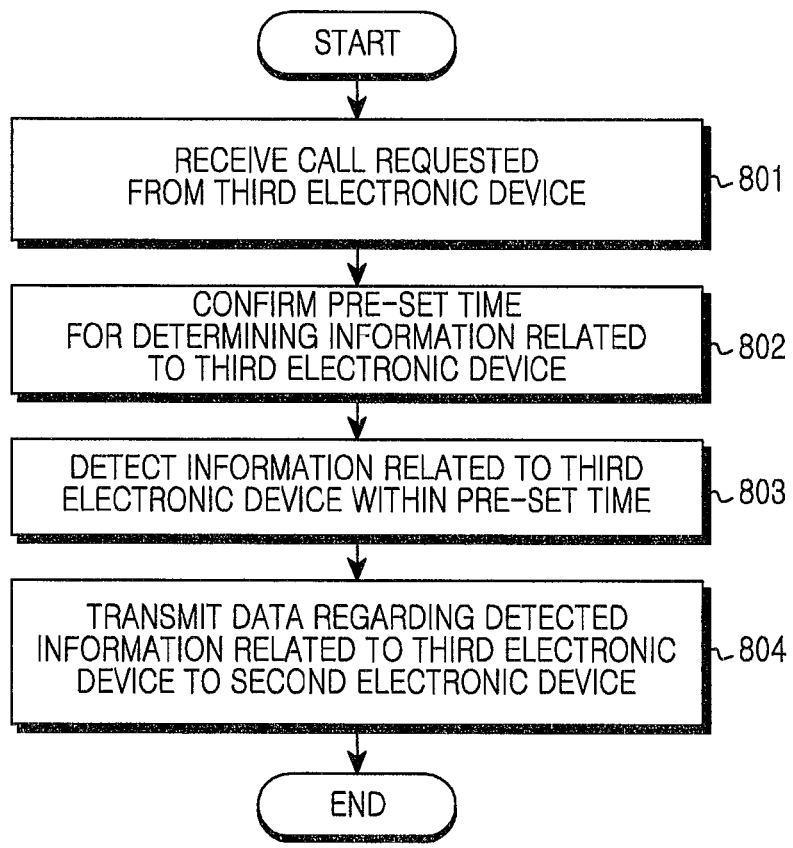
FIG. 8 is a flowchart illustrating an order of operating a first electronic device according to an exemplary embodiment of the present disclosure.

FIG. 8 is a flowchart illustrating an order of operating a first electronic device according to an exemplary embodiment of the present disclosure. First, as illustrated in FIG. 8, the first electronic device may receive a call requested from a third electronic device (step 801). Herein, a phone number of the third electronic device may be a number stored in the first electronic device, or may be a number not stored in the first electronic device.

Thereafter, the first electronic device may confirm a time configured to detect information related to the third electronic device (step 802). If it is determined in the first electronic device that a range of time for detecting the information related to the third electronic device is pre-set, the first electronic device may detect the information related to the third electronic device within the pre-set time. For example, if it is assumed that the range of time for detecting the information related to the third electronic device is one week in the first electronic device, the first electronic device may detect information included in the range of one week in the information related to the third electronic device.

Thereafter, the first electronic device may detect the information related to the third electronic device (step 803). That is, the first electronic device may detect a variety of information such as message content exchanged mutually between the first electronic device and the third electronic device, e-mail content, dialog content using a dialog application, dialog content using an SNS, schedule content agreed with a user of the third electronic device, etc.

Thereafter, the first electronic device may transmit data regarding the detected information related to the third electronic device to the second electronic device (step 804). Herein, since the first electronic device and the second electronic device are mutually synchronized, the first electronic device may transmit the data regarding the detected information related to the third electronic device to the second electronic device. More specifically, the data regarding the information related to the third electronic device may be transmitted automatically from the first electronic device to the second electronic device, and upon receiving a request for transmitting specific data from the second electronic device, the first electronic device may transmit requested data to the second electronic device. In addition, upon receiving an input of a command for transmitting specific data to the second electronic device, the first electronic device may transmit the specific data to the second electronic device.

Figure 9:
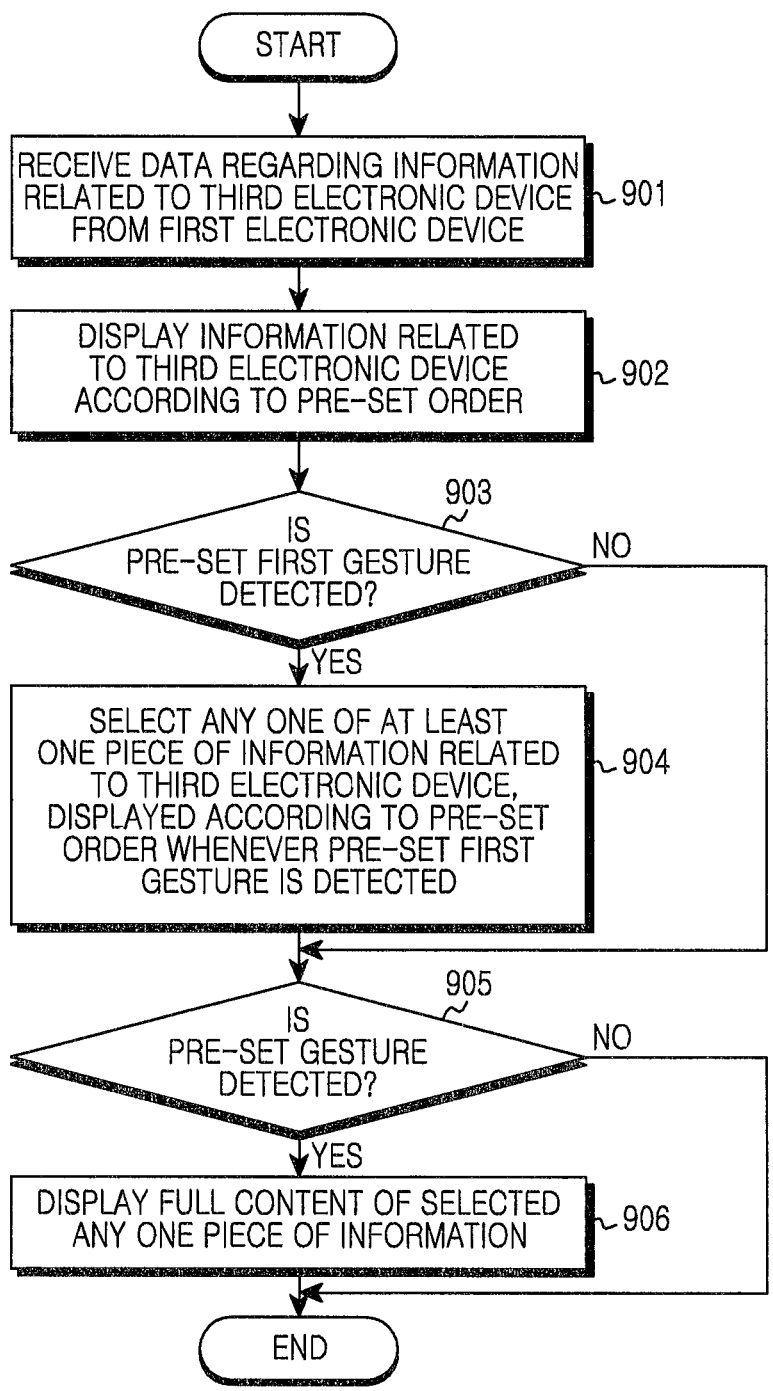
FIG. 9 is a flowchart illustrating an order of operating a second electronic device according to an exemplary embodiment of the present disclosure.

FIG. 9 is a flowchart illustrating an order of operating a second electronic device according to an exemplary embodiment of the present disclosure. First, as illustrated in FIG. 9, the second electronic device may receive data regarding information related to a third electronic device from a first electronic device (step 901). More specifically, the second electronic device may receive from the first electronic device message content which is information related to the third electronic device on a call, e-mail content, a call record, dialog application content, SMS content, schedule content, etc.

Thereafter, the second electronic device may display the information related to the third electronic device according to a pre-set order (step 902). More specifically, if it is determined that an order of priority of displaying the at least one piece of information related to the third electronic device is pre-set in the second electronic device, according to the order of priority, the second electronic device may display the at least one piece of information related to the third electronic device in a touch screen in descending order of priority.

Thereafter, the second electronic device may determine whether a pre-set first gesture is detected (step 903). Herein, the first gesture may be defined as a gesture capable of sequentially selecting any one of at least one piece of information related to the third electronic device and displayed according to an order which is pre-set in the second electronic device. For example, the first gesture may be a gesture for moving the second electronic device by a pre-set angle in a clockwise direction, a counter-clockwise direction, an uplink direction, and a downward direction. In addition thereto, the first gesture may be a gesture which is dragged in a detectable manner in the second electronic device.

If it is determined in step 903 that the pre-set first gesture is detected in the second electronic device, the second electronic device may sequentially select any one of the at least one piece of information related to the third electronic device and displayed according to a pre-set order whenever the pre-set first gesture is detected (step 904). For example, it is assumed that "message content, SNS content, and call content" transmitted and received with respect to the third electronic device are displayed in that order in a touch screen of the second electronic device, and the user of the first electronic device and the second electronic device intends to confirm a specific call content. In addition, it is assumed that the first gesture capable of selecting the communication content in the second electronic device is a gesture which moves by a pre-set angle in a clockwise direction. In the aforementioned assumption, if the first gesture which moves by the pre-set angle in the clockwise direction is detected once, the second electronic device may select communication content of "SNS content" from communication content of "message content" currently displayed in an uppermost portion of the touch screen of the second electronic device. Thereafter, if the first gesture which moves by the pre-set angle in the clockwise direction is detected one more time, the second electronic device may select communication content of "call content" from communication content of "SNS content" currently displayed in the uppermost portion of the touch screen of the second electronic device.

Thereafter, the second electronic device may determine whether a pre-set second gesture is detected (step 905). Herein, the second gesture may be defined as a gesture for displaying full content of any one piece of information related to the third electronic device selected through the first gesture in the second electronic device. For example, the second gesture may be a gesture for moving the second electronic device by a pre-set angle in a clockwise direction, a counter-clockwise direction, an uplink direction, and a downward direction. In addition thereto, the first gesture may be a gesture which is dragged in a detectable manner in the second electronic device.

If it is determined in step 905 that the pre-set second gesture is detected in the second electronic device, the second electronic device may display full content of the selected any one piece of information (step 906). For example, it is assumed that "call content, message content, and e-mail content" transmitted and received with respect to the third electronic device are displayed in that order in the touch screen of the second electronic device, and the user of the first electronic device and the second electronic device intends to confirm a specific call content. In addition, it is assumed that the second gesture for displaying full communication content in the second electronic device is a gesture which moves by a pre-set angle in a counter-clockwise direction. In the aforementioned assumption, if the second gesture which moves by the pre-set angle in the counter-clockwise direction is detected once, the second electronic device may display in the touch screen of the second electronic device full content of "call content" currently displayed in the uppermost portion of the touch screen of the second electronic device. That is, the second electronic device may display full call content with respect to the third electronic device within a pre-set time such as an unanswered call, a calling time, etc., in the touch screen of the second electronic device.

However, if the second electronic device fails to detect the pre-set first gesture in step 903, the second electronic device may repeat step 905 for detecting the pre-set second gesture. In addition, if the second electronic device fails to detect the pre-set second gesture in step 905, the second electronic device may immediately end the aforementioned operation procedure.

Figure 10:
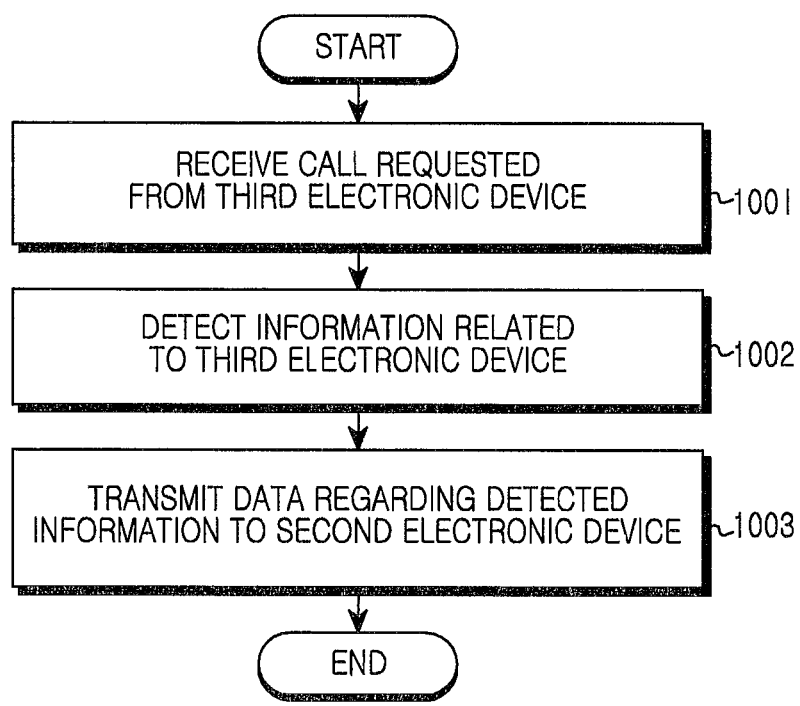
FIG. 10 is a flowchart illustrating a method of a first electronic device for detecting information of a person on the other end of a call according to an exemplary embodiment of the present disclosure.

FIG. 10 is a flowchart illustrating a method of a first electronic device for detecting information of a person on the other end of a call according to an exemplary embodiment of the present disclosure. First, as illustrated in FIG. 10, the first electronic device may receive a call requested from a third electronic device (step 1001). Herein, a phone number of the third electronic device may be a number stored in the first electronic device, or may be a number not stored in the first electronic device.

Thereafter, the first electronic device may detect the information related to the third electronic device (step 1002). That is, the first electronic device may detect a variety of information such as message content exchanged mutually between the first electronic device and the third electronic device, e-mail content, dialog content using a dialog application, dialog content using an SNS, schedule content agreed with a user of the third electronic device, etc.

Thereafter, the first electronic device may transmit and receive data regarding the detected information to the second electronic device (step 1003). Herein, since the first electronic device and the second electronic device are mutually synchronized, the first electronic device may transmit the data regarding the detected information related to the third electronic device to the second electronic device. More specifically, the data regarding the information related to the third electronic device may be transmitted automatically from the first electronic device to the second electronic device, and upon receiving a request for transmitting specific data from the second electronic device, the first electronic device may transmit requested data to the second electronic device. In addition, upon receiving an input of a command for transmitting specific data to the second electronic device, the first electronic device may transmit the specific data to the second electronic device.

Figure 11:
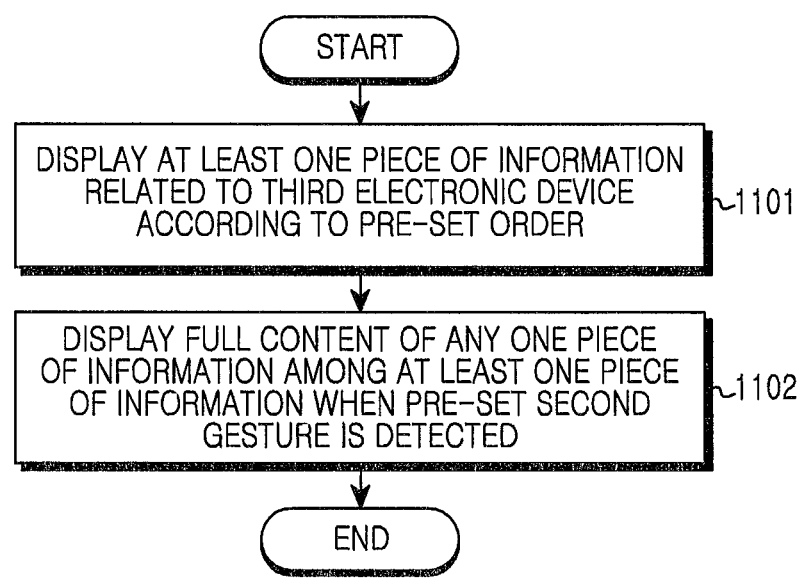
FIG. 11 is a flowchart illustrating a method of a second electronic device for detecting information of a person on the other end of a call according to an exemplary embodiment of the present disclosure.

FIG. 11 is a flowchart illustrating a method of a second electronic device for detecting information of a person on the other end of a call according to an exemplary embodiment of the present disclosure. First, as illustrated in FIG. 11, the second electronic device may display the information related to the third electronic device according to a pre-set order (step 1101). More specifically, if it is determined that an order of priority of displaying the at least one piece of information related to the third electronic device is pre-set in the second electronic device, according to the order of priority, the second electronic device may display the at least one piece of information related to the third electronic device in a touch screen in descending order of priority.

Thereafter, if a pre-set gesture is detected, the second electronic device may display full content related to any one piece of information among the at least one piece of information (step 1102). More specifically, upon detecting the pre-set second gesture in the second electronic device, the second electronic device may display specific full content of the information related to the third electronic device and currently displayed in the touch screen of the second electronic device.

Figure 12:
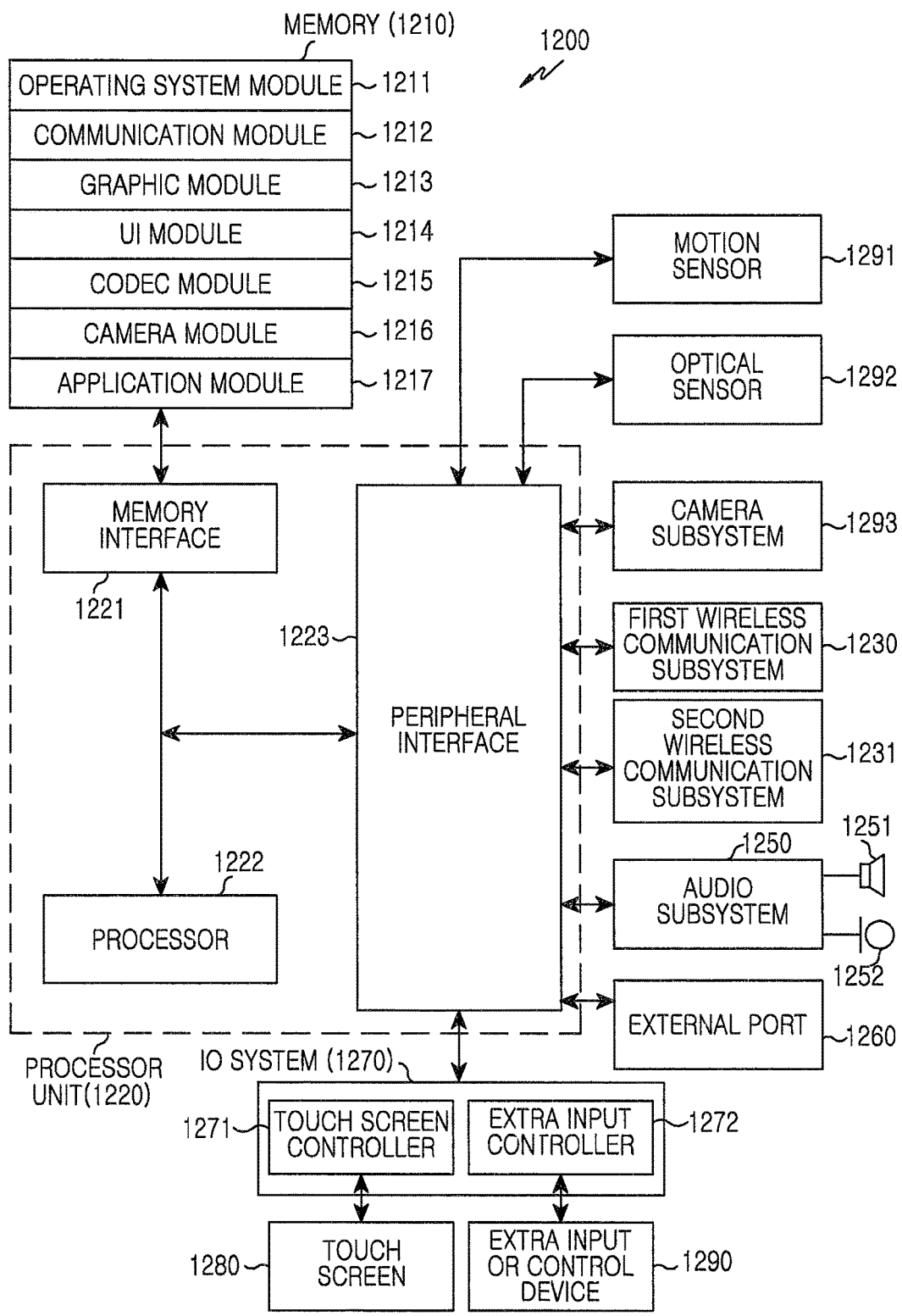
FIG. 12 is a block diagram illustrating a structure of an electronic device according to an exemplary embodiment of the present disclosure.

FIG. 12 is a block diagram illustrating a structure of an electronic device according to an exemplary embodiment of the present disclosure. An electronic device 1200 may be a portable electronic device. Further, the electronic device may be a portable terminal, a mobile phone, a mobile pad, a media player, a tablet computer, a handheld computer, or a Personal Digital Assistant (PDA). In addition, the electronic device may be any portable electronic device including a device which combines two or more functions among these devices.

The electronic device 1200 includes a memory 1210, a processor unit 1220, a first wireless communication subsystem 1230, a second wireless communication subsystem 1231, an external port 1260, an audio subsystem 1250, a speaker 1251, a microphone 1252, an Input Output (JO) system 1270, a touch screen 1280, and an extra input or control device 1290. The memory 1210 and the external port 1260 may be plural in number.

The processor unit 1220 may include a memory interface 1221, one or more processors 1222, and a peripheral interface 1223. Occasionally, the entire processor unit 1220 may be referred to as a processor. In the present disclosure, the processor unit 1220 may detect information related to a third electronic device. In addition, the processor unit 1220 may determine whether a time of detecting the information related to the third electronic device is pre-set, and if it is determined that the time for detecting the information related to the third electronic device is pre-set, may detect the information related to the third electronic device within the pre-set time. Herein, the information related to the third electronic device may be message content exchanged mutually between the first electronic device and the third electronic device, e-mail content, dialog content using a dialog application, dialog content using an SNS, schedule content agreed with a user of the third electronic device, etc. In addition, the processor unit 1220 may determine whether an order of priority for displaying at least one piece of information related to the third electronic device is pre-set, and may detect a pre-set first gesture to select any one of the at least one piece of information related to the third electronic device and displayed according to the pre-set order. In addition, upon determining that the pre-set first gesture is detected, the processor unit 1220 may sequentially select any one of the at least one piece of information related to the third electronic device and displayed according to the pre-set order whenever the pre-set first gesture is detected.

The processor 1222 performs various functions for the electronic device 1200 by executing a variety of software programs, and processes and controls voice communication and data communication. In addition to such a typical function, the processor 1222 also takes a role of executing a specific software module (i.e., an instruction set) stored in the memory 1210 and thus performing various specific functions corresponding to the module. That is, the processor 1222 performs the method of the exemplary embodiment of the present disclosure by synchronizing with software modules stored in the memory 1210.

The processor 1222 may include one or more data processors, an image processor, or a codec. The data processor, the image processor, or the codec may be configured separately. In addition, these elements may be configured as several processors each of which performs a different function. The peripheral interface 1223 connects various peripheral devices of the electronic device 1200 to the processor 1222 and the memory 1210 (via the memory interface).

Various constitutional elements of the electronic device 1200 may be coupled by means of at least one communication bus (its reference numeral is not shown) or stream line (its reference numeral is not shown).

The external port 1260 is used to directly connect a portable electronic device (not shown) to another electronic device, or indirectly connects the portable electronic device to another electronic device through a network (e.g., internet, intranet, wireless Local Area Network (LAN), etc.). For example, although not limited thereto, the external port 160 refers to a Universal Serial Bus (USB) port or a FIREWIRE port.

A motion sensor 1291 and an optical sensor 1292 may be connected to the peripheral device interface 1223 to enable several functions. For example, the motion sensor 1291 and the optical sensor 1292 may be connected to the peripheral device interface 1223 to detect a motion of the electronic device 100 or to detect an external light beam. In addition, other sensors such as a positioning system, a temperature sensor, a bio sensor, etc., may be connected to the peripheral device interface 1223 to perform related functions.

A camera subsystem 1293 may perform a camera function such as capturing, video clip recoding, etc.

The optical sensor 1292 may use a Charge Coupled Device (CCD) device or a Complementary Metal-Oxide-Semiconductor (CMOS) device.

One or more wireless communication subsystems 1230 and 1231 are used to perform a communication function. The wireless communication subsystems 1230 and 1231 may include a radio frequency receiver and transceiver and/or an optical (e.g., infrared ray) receiver and transceiver. The first communication subsystem 1230 and the second communication subsystem 1231 may be identified according to a communication network through which the electronic device 1200 communicates. For example, the communication network is not limited thereto, and the subsystem may include a communication subsystem designed to operate through a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network. The first wireless communication subsystem 1230 and the second wireless communication subsystem 1231 may be combined to constitute one wireless communication subsystem.

The audio subsystem 1250 is coupled to a speaker 1251 and a microphone 1252, and performs an input and output of an audio stream such as voice recognition, voice recording, digital recording, telephony, etc. That is, the audio subsystem 1250 communicates with the user via the speaker 1251 and the microphone 1252. The audio subsystem 1250 receives a data stream via the peripheral interface 1223 of the processor unit 1220, and converts the received data stream into an electric stream. A converted electric signal is delivered to the speaker 1251. The speaker 1251 converts the electric stream into a sound wave that can be heard by the human user, and outputs the electric stream. The microphone 1252 converts the sound wave delivered from a human user or other different sound sources into an electronic stream. The audio subsystem 1250 receives the converted electronic stream from the microphone 1252. The audio subsystem 1250 converts the received electric stream into an audio data stream, and transmits the converted audio data stream to the peripheral interface 1223. The audio subsystem 1250 may include an attachable and detachable ear phone, headphone, or head set.

The I/O subsystem 1270 includes a touch screen controller 1271 and/or an extra input controller 1272. The touch screen controller 1271 may be coupled to the touch screen 1280. Although not limited thereto, the touch screen 1280 and the touch screen controller 1271 may use not only capacitance, resistance, infrared and surface sound wave techniques for determining one or more contact points but also any multi-touch sense technique including other proximity sensor arrays or other elements to detect a contact, a movement, or stopping thereof. The extra input controller 1272 may be coupled to extra input/control devices 1290. The extra input/control devices 1290 may be one or more buttons, a rocker, a switch, a thumb-wheel, a dial, a stick, and/or a pointer device such as a stylus.

The touch screen 1280 provides an input/output interface between the electronic device 1200 and the user. That is, the touch screen 1280 delivers a touch input of the user to the electronic device 1200. In addition, the touch screen 1280 is a medium which shows to the user an output from the electronic device 1200. That is, the touch screen 1280 shows a visual output to the user. Such a visual output is represented in the form of a text, a graphic, a video, and a combination thereof.

A variety of displays may be used as the touch screen 1280. For example, although not limited thereto, the touch screen 1280 may include a Liquid Crystal Display (LCD), a Light Emitting Diode (LED), a Light Emitting Polymer Display (LPD), an Organic Light Emitting Diode (OLED), an Active Matrix Organic Light Emitting Diode (AMO-LED), or a Flexible LED (FLED). In the present disclosure, the touch screen 1280 may display at least one piece of information related to the third electronic device, and if a pre-set gesture is detected, may display full content related to any one piece of information among the at least one piece of information. In addition, if it is determined that an order of priority is pre-set, according to the pre-set order of priority, the touch screen 1280 may display the at least one piece of information related to the third electronic device in descending order of priority.

The memory 1210 may be coupled to the memory interface 1221. The memory 1210 may include a fast random access memory such as one or more magnetic disc storage devices and/or a non-volatile memory, one or more optical storage devices, and/or a flash memory (e.g., NAND, NOR).

The memory 1210 stores a software component. The software component may include an operating system module 1211, a communication module 1212, a graphic module 1213, a User Interface (UI) module 1214, a CODEC Module or a Moving Picture Experts Group (MPEG) module 1215, a camera module 1216, one or more application modules 1217, etc. In addition, a module which is a software component may be expressed as a set of instructions. The module may be referred to as an 'instruction set' or a 'program'. The operating system program 1211 (e.g., a built-in operating system such as WINDOWS, LINUX, Darwin, RTXC, UNIX, OS X, or VxWorks) includes various software components for controlling a general system operation. For example, the control of the general system operation includes memory management and control, storage hardware (device) control and management, power control and management, etc. The operating system software performs a function for facilitating communication between various hardware components (devices) and software components (programs).

The communication module 1212 may enable communication with other electronic devices such as a computer, a server, and/or a portable terminal via the wireless communication subsystems 1230 and 1231 or the external port 1260. The communication module 1212 of the present disclosure may receive a requested call from the third electronic device and transmit detected information to the second electronic device. In addition, the communication module 1212 may receive data related to the third electronic device from the first electronic device.

The graphic module 1213 includes various software components for providing and displaying graphics on the touch screen 1280. The terminology of "graphics" indicates a text, a web page, an icon, a digital image, a video, an animation, etc.

The user interface module 1214 includes various software components related to a user interface. The user interface software module includes content related to how a state of the user interface changes and in which condition the state of the user interface changes.

The CODEC module 1215 may include software components related to encoding and decoding of a video file. The CODEC module may include a video stream module such as an MPEG module and/or an H204 module. In addition, the CODEC module may include a CODEC module for several audio files, such as AAA, AMR, WMA, etc. In addition, the CODEC module 1215 may include an instruction set corresponding to the method of implementing the present disclosure.

The camera module 1216 includes a camera-related software component which enables camera-related processes and functions.

The application module 1217 includes a browser, an e-mail, an instant message, word processing, keyboard emulation, an address book, a touch list, a widget, a Digital Right Management (DRM), voice recognition, voice reproduction, a location determining function, a location-based service, etc.

In addition, various functions of the electronic device of the present disclosure, described above and to be described below, can be performed by using one or more stream processors and/or a hardware component including an Application Specific Integrated Circuit (ASIC) and/or a software component and/or a combination thereof.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of operating a first electronic device, the method comprising:
   receiving a call request from a third electronic device;
   in response to receiving the call request, detecting information related to the third electronic device in communication with the first electronic device; and
   transmitting, by the first electronic device, the detected information to a second electronic device synchronized wirelessly with the first electronic device, the second electronic device being a wearable device configured to be placed on a specific part of a user's body,
   wherein the first electronic device displays information related to the call request, and the second electronic device displays, according to a pre-set order, the information received from the first electronic device and each icon corresponding to the information related to the third electronic device.

2. The method of claim 1, wherein the information related to the third electronic device comprises at least one of message content, e-mail content, a call record, dialog application content, social network service (SNS) content, or schedule content.

3. The method of claim 1, further comprising transmitting, by the first electronic device, unconfirmed communication content to the second electronic device.

4. The method of claim 1, wherein detecting the information related to the third electronic device comprises:
   determining whether a time range to limit a detection of information within the time range prior to the call request is pre-set; and
   in response to determining that the time range to limit the detection of the information within the time range prior to the call request is pre-set, detecting the information related to the third electronic device within the time range prior to the call request.

5. A method of operating a second electronic device, the method comprising:
   receiving information related to a third electronic device in communication with a first electronic device from the first electronic device synchronized wirelessly with the second electronic device;
   displaying, by the second electronic device, the information and each icon corresponding to the information related to the third electronic device according to a pre-set order;
   in response to detecting a first gesture, sequentially selecting one piece of the information displayed according to the pre-set order when the first gesture is detected; and
   in response to detecting a second gesture, displaying full content of the selected information by the first gesture among the information related to the third electronic device,
   wherein the second electronic device is a wearable device configured to be placed on a specific part of a user's body, and
   wherein the first gesture is moved in a first direction, and the second gesture is moved in a second direction opposite the first direction.

6. The method of claim 5, wherein the information related to the third electronic device comprises at least one of message content, e-mail content, a call record, dialog application content, social network service (SNS) content, or schedule content.

7. The method of claim 5, wherein displaying the information according to the pre-set order further comprises:
determining whether an order of priority for displaying the information is set, and
if the order of priority is set, displaying the information related to the third electronic device in descending order of priority according to the set order of priority.

8. The method of claim 5, wherein if the first direction of the first gesture is a clockwise direction, the second direction of the second gesture is counter-clockwise direction, and
wherein if the first direction of the first gesture is an upward direction, the second direction of the second gesture is a downward direction.

9. A first electronic device, comprising:
a communication interface; and
a processor configured to:
receive a call request from a third electronic device,
in response to receiving the call request, detect information related to the third electronic device in communication with the first electronic device, and
transmit the detected information to a second electronic device synchronized wirelessly with the first electronic device, the second electronic device being a wearable device configured to be placed on a specific part of a user's body,
wherein the first electronic device displays information related to the call request, and the second electronic device displays, according to a pre-set order, the information received from the first electronic device and each icon corresponding to the information related to the third electronic device.

10. The first electronic device of claim 9, wherein the information related to the third electronic device comprises at least one of message content, e-mail content, a call record, dialog application content, social network service (SNS) content, or schedule content.

11. The first electronic device of claim 9, wherein the processor is further configured to transmit unconfirmed communication content to the second electronic device.

12. The first electronic device of claim 9, wherein the processor is configured to:
determine whether a time range to limit a detection of information within the time range prior to the call request is pre-set; and
in response to determining that the time range to limit the detection of the information within the time range prior to the call request is pre-set, detect the information related to the third electronic device within the time range prior to the call request.

13. A second electronic device, comprising:
a touch screen configured to display information related to a third electronic device; and
a processor configured to:
receive information related to the third electronic device in communication with a first electronic device from the first electronic device synchronized wirelessly with the second electronic device;
display, by the second electronic device, the information and each icon corresponding to the information related to the third electronic device according to a pre-set order;
in response to detecting a first gesture, sequentially select one piece of the information displayed according to the pre-set order when the first gesture is detected; and
in response to detecting a second gesture, display full content of the selected information by the first gesture among the information related to the third electronic device,
wherein the second electronic device is a wearable device configured to be placed on a specific part of a user's body, and
wherein the first gesture is moved in a first direction, and the second gesture is moved in a second direction opposite the first direction.

14. The second electronic device of claim 13, wherein the information related to the third electronic device comprises at least one of message content, e-mail content, a call record, dialog application content, social network service (SNS) content, or schedule content.

15. The second electronic device of claim 13, wherein the processor is configured to:
determine whether an order of priority for displaying the information is set, and
if the order of priority is set, display the information related to the third electronic device in descending order of priority according to the set order of priority.

16. The second electronic device of claim 13, wherein if the first direction of the first gesture is a clockwise direction, the second direction of the second gesture is counter-clockwise direction, and
wherein if the first direction of the first gesture is an upward direction, the second direction of the second gesture is a downward direction.

* * * * *